Dec. 25, 1945. J. A. HEANY 2,391,454
PROCESS OF MAKING ALUMINOUS PRODUCTS
Filed April 6, 1942
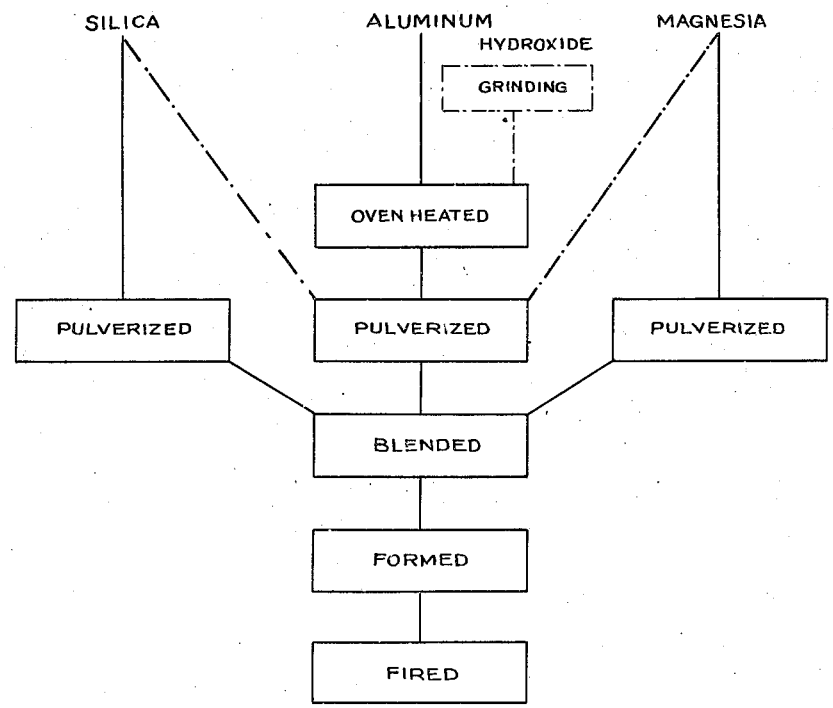
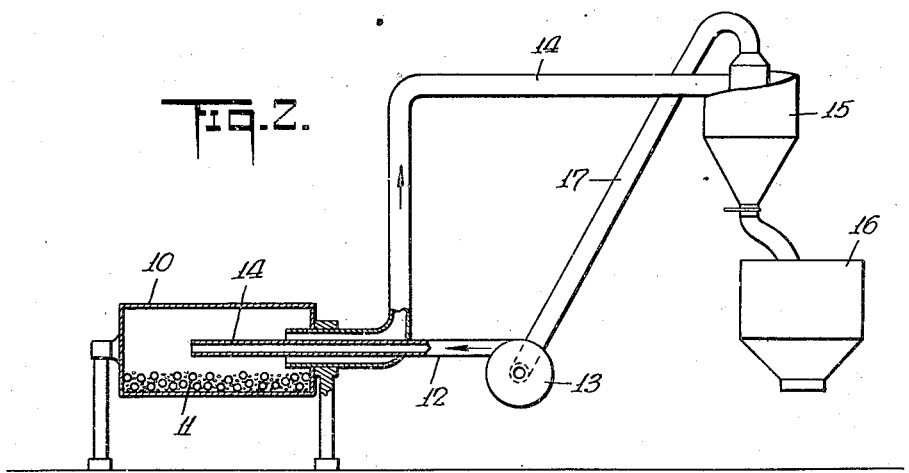
INVENTOR
John Allen Heany
BY
Braselton Whitcomb & Davies
ATTORNEYS Patented Dec. 25, 1945

2,391,454

UNITED STATES PATENT OFFICE 2,391,454

PROCESS OF MAKING ALUMINOUS PRODUCTS

John Allen Heany, New Haven, Conn., assignor to Heavy Industrial Ceramic Corporation, Rochester, N. Y., a corporation of New York Application April 6, 1942, Serial No. 437,789

16 Claims. (Cl. 106—62)

This invention relates to a dense, non-porous, aluminous ceramic and a process for making the same by ceramic methods.

Pure alumina has a melting point around 2020° C. (Smithsonian physical tables) and hence cannot be processed by ordinary ceramic methods. In my co-pending application Serial No. 135,369, filed April 7, 1937, now Patent No. 2,278,442, I have set forth one method by which substantially pure alumina may be treated in preparing ceramic articles wherein the firing temperature does not exceed 1700° C. In this one method I employ purified commercial hydrated alumina which is partially dehydrated at temperatures not substantially above red heat. To this alumina I add small amounts of magnesia and silica as catalysts and subject the mixture to wet grinding, thus reducing the particle size to under 50 microns. The material is then formed and fired at temperatures below 1700° C.

While wet grinding is usually efficient and satisfactory, in some uses I find it desirable to employ dry grinding methods. A difficulty arises, however, in dry grinding from the fact that air float steps must be used which usually interfere with the securing of a complete and uniform mixture of the aluminum hydroxide and the catalytic ingredients.

One of the important objects of the present invention, therefore, is to provide a process for making aluminous products in which dry grinding steps only are used to obtain the required small particle size.

Other objects will appear on consideration of the following description in connection with the accompanying drawing, in which:

Fig. 1 is a flow diagram showing the process steps of the invention; and

Fig. 2 is a view illustrating diagrammatically one method of air float grinding.

As the raw material for my finished ceramic product I use alumina in the form of an hydroxide $Al(OH)_3$ which is obtainable on the open market. The process usually employed in making aluminum hydroxide is fusion of bauxite with soda ash followed by dissociation of the melt (sodium aluminate) with hot water and precipitation of aluminum hydroxide by a stream of carbon dioxide.

With this commercial aluminum hydroxide as a starting material, I first preferably reduce the same to a powder by the use of a grinding or hammer mill (see Fig. 1). This powder is then heated in an oven to a temperature sufficient to reduce the water of hydration down to a range, roughly, from ½% to 7%, the ignition loss being in some instances as high as 34.39%. This heat usually varies in a range from 1400° C. to 1000° C., and in some cases as low as 500° C. In any event, this heat should not exceed the point where the material ceases to be amorphous and plastic.

After the dehydration step the weakly hydrated alumina is placed in a ball mill and ground for a period of 50 hours or more until the particles of alumina are reduced to a diameter under 50 microns, i. e., having an average size under 25 microns. Usually the average diameter of the alumina particles after the grinding step is well under 12 microns, over 75% being below 5 microns.

Various commercial pulverizing or grinding apparatus may be used to reduce the alumina to fine particle size, such as ball mills, hammer mills, roller mills and the like. I have found the ball mill satisfactory and in Fig. 2 I have shown diagrammatically a ball mill installation including a ball or peddle mill chamber 10 containing balls or pebbles 11, an air inlet 12 connecting to an air pump 13, a combined air and dust outlet 14 connecting to an air separator 15 (e. g. cyclone type) and a bin or receptacle 16 connected to the collector exit. The mill may employ flint pebbles and be flint lined in order not to introduce foreign matter from the normal disintegration of the pebbles and lining. From the separator 15 an air conduit 17 may lead back to the air pump.

Magnesia and silica, which have been separately and similarly ground in a ball mill or equivalent machine to a size of 50 microns or less, are now weighed and added, in proper proportions, to the alumina. In a typical mix I may use 2% magnesia and 3% silica, but the proportions may vary, as for example 0.4% to 8.0% of magnesia and 0.6% to 12.0% of silica, based on weight of alumina after dehydration. The alumina should constitute 80% to 99% of the mixture after the dehydration heat of the alumina, that is, the catalytic oxides should not exceed 20%, and preferably 10%, of the combined weight of the materials after dehydration of the aluminum hydroxide. It is noted that magnesia is basic, of the oxides including the alkali metals; and that silica is acid, of the oxides including boron oxide, and so forth. These catalytic oxides should be substantially pure, insoluble in water and must not act as fluxing or bonding agents. Each oxide should be added as such, since the catalytic effect is materially diminished by a preliminary chemical combination of the basic and acid substances.

The preferred composition contains 95% $Al_2O_3$,

2% MgO and 3% SiO$_2$. Although these proportions are preferred, the following proportions have also been found satisfactory for many purposes:

(A) 80.0% Al$_2$O$_3$, 8.0% MgO, 12.0% SiO$_2$
(B) 90.0% Al$_2$O$_3$, 4.0% MgO, 6.0% SiO$_2$
(C) 99.0% Al$_2$O$_3$, 0.4% MgO, 0.6% SiO$_2$

These three substances, the dry, partially dehydrated alumina, the magnesia and silica, are now thoroughly mixed together in a blending machine of any known commercial type meeting the requirement of thorough, intimate mixing. For example, the barrel blending machine of the Day type may be used.

After blending, the material now in extremely small particle size and intimately intermixed, is formed to the desired product by any of the known processes of the ceramic arts. For example, if I desire to obtain crucibles, plates, disks and the like by the slip casting method, I mix the powder with water to form a creamy mass which is poured into a plaster of Paris mold. Alternately, I may extrude a wet mass of the mixture through an extruding machine, i. e., a pug mill, the extruded substance being in sheet, tube or cylinder form. As desired, air may be withdrawn in the pug mill so that the extruded mass is devoid of air and gas bubbles. If the extrusion method is used it may be desirable to add a temporary binder such as gulac or casein to the water and mix, before extrusion. The extrusion method is appropriate for articles such as tiles, bricks, plates and the like.

Having formed the article, the same is now placed in a ceramic furnace or kiln and heated to a temperature around 1500° C. and preferably not exceeding 1700° C., and below the temperature of fusion of the alumina. At these temperatures the material becomes hard, dense and vitreous, breaks with a conchoidal fracture, is non-porous and is substantially amorphous. Tests of sample lots of the final material show a density of 3.84 and a hardness of 78C on the Rockwell hardness C-scale.

In the final heat the top temperature is usually maintained for sufficient time—depending on the size of the furnace and mass being treated—to bring about a uniform transformation of the material to a hard, dense, non-porous substance. While the exact reaction is not clear, there appears to be some reaction between the hydrated alumina and the acid and alkaline additives, the latter substance acting apparently as catalysts. This viewpoint is supported by the fact that the amorphous, aluminous product is obtainable with as little as 1% of additives—too small an amount to produce a so-called bond. In other words, my product seems to be self-bonding at temperatures within the ceramic range (1700° C. and below).

In the process as hereinabove described, the catalysts are pulverized separately from the aluminum hydroxide and then blended. As an alternate process step, useful under certain conditions, the catalysts and hydroxide may be pulverized together and then subjected to a blending step to secure a proper, uniform distribution of the materials. This alternative process is indicated in Fig. 1 by dotted lines.

Abrasives, as well as ceramic products, may be made from my material. To obtain abrasives, the material, before the final firing, is pressed, either dry or with a lubricant or with organic binder. The pressed blocks are then fired and then while hot (if cooled they are reheated to a red heat) suddenly cooled, as by dumping directly into water, thus causing cracks and fissures to form in the blocks and permitting granulation between crushing rolls, and screening to size.

Alternately, the powdered, blended material may be fired and then crushed and graded.

The finely divided aluminous material as produced next prior to the firing step, may be readily used as a bonding agent in connection with other ceramics, such as those composed of the silicates, magnesia and so forth; or after firing, the granular alumina may be used as a filler in making other ceramic materials.

It is understood that the process steps of the present invention are carried out by machines commercially available, such as the Hardinge ball mill and air flow separator, the Day blender, the F-R-H vacuum pottery pug mill or the Ruggles Cole furnace.

It is pointed out that through the dehydration heat treatment of the alumina, the shrinkage at the final heat is reduced to less than 30%, a value which is practical for ceramic manufacture.

Also, it has been found particularly satisfactory to introduce oxidizing gases containing air into the furnace atmosphere at the final heat, either during firing or cooling, or both. However, a reducing atmosphere containing substantial quantities of hydrogen and carbon monoxide or other reducing gases; or a neutral atmosphere may be used. The hardness of the ceramic diminishes in order, depending on the atmosphere being oxidizing, reducing or neutral.

The present application is a continuation-in-part of my co-pending application Serial No. 135,369, filed April 7, 1937, and differs thereover chiefly in that it employs a dry grinding step in contradistinction to the wet grinding step of the said co-pending application.

An extremely intimate mixture of the catalyst and aluminum hydroxide particles seems to be essential for the success of the processes. This is efficiently accomplished by wet grinding the materials together. In dry grinding, however, the air float is withdrawn as soon as grinding begins and before the materials are properly mixed. Hence the withdrawn mix is not uniform and products made therefrom would lack the characteristic properties of my process. However, by pulverizing the catalyst and hydroxide separately and then blending, or, alternately, pulverizing the materials together and then blending, the desired uniformity of mix is secured.

It is apparent that many changes may be made in the processes above described, and in the details thereof, without substantially departing from the invention intended to be defined in the claims, the specific description merely serving to illustrate embodiments wherein the spirit of the invention may be effectuated.

I claim as my invention:

1. A process of making an aluminous product which is uniformly hard, dense, vitreous, and non-porous which comprises partially dehydrating aluminum hydroxide, dry grinding the dehydrated hydroxide to an average particle size of less than 50 microns, blending the ground particles with similarly sized particles of catalysts, forming and firing.

2. A process of making an aluminous product which is uniformly hard, dense, vitreous, and non-porous which comprises partially dehydrating aluminum hydroxide, dry grinding the dehydrated hydroxide to an average particle size of less than 50 microns, blending the ground particles with similarly sized particles of basic and acid oxides, forming and firing.

3. A process of making an aluminous product which is uniformly hard, dense, vitreous, and non-porous which comprises partially dehydrating aluminum hydroxide, dry grinding the dehydrated hydroxide to an average particle size of less than 50 microns, blending the ground particles with similarly sized particles of magnesia and silica, forming and firing.

4. A process of making an aluminous product which is uniformly hard, dense, vitreous, and non-porous which comprises partially dehydrating aluminum hydroxide, dry grinding the dehydrated hydroxide to an average particle size of less than 50 microns, blending the ground particles with similarly sized particles of magnesia and silica, to the magnesia not exceeding 8% and the silica not exceeding 12%, forming and firing.

5. A process of making an aluminous product which is uniformly hard, dense, vitreous, and non-porous which comprises partially dehydrating aluminum hydroxide, dry grinding the dehydrated hydroxide to an average particle size of less than 50 microns, blending the ground particles with similarly sized particles of catalysts in total amounts not exceeding 20%, forming and firing.

6. A process of making an aluminous product which is uniformly hard, dense, vitreous, and non-porous which comprises partially dehydrating aluminum hydroxide, dry grinding the dehydrated hydroxide to an average particle size of less than 50 microns, blending the ground particles with similarly sized particles of magnesia to 2% and silica to 3%, forming and firing.

7. A process of making an aluminous product which is uniformly hard, dense, vitreous and non-porous which comprises partially dehydrating aluminum hydroxide, dry grinding the dehydrated hydroxide to an average particle size of less than 50 microns, blending the ground particles with similarly sized particles of catalysts to an amount not exceeding 20%, forming and firing at a temperature below 1700° C.

8. A process of making an aluminous product which is uniformly hard, dense, vitreous, and non-porous which comprises partially dehydrating aluminum hydroxide at a temperature below 1400° C., dry grinding the dehydrated hydroxide to an average particle size of less than 50 microns, blending the ground particles with similarly sized particles of catalysts to an amount not exceeding 20%, forming and firing at a temperature below 1700° C.

9. A process of making an aluminous product which is uniformly hard, dense, vitreous, and non-porous which comprises partially dehydrating aluminum hydroxide, dry grinding the dehydrated hydroxide to an average particle size of less than 50 microns, blending the ground particles with similarly sized particles of magnesia and silica in quantities not exceeding 8% of magnesia and 12% of silica by weight with dehydrated aluminum hydroxide.

10. A process of making an aluminous product which is uniformly hard, dense, vitreous, and non-porous which comprises partially dehydrating aluminum hydroxide, dry grinding the dehydrated hydroxide to an average particle size of less than 50 microns, blending the ground particles with similarly sized particles of magnesia and silica in quantities of 2% magnesia and 3% silica by weight with dehydrated aluminum hydroxide.

11. A process of making an aluminous product which is uniformly hard, dense, vitreous, and non-porous which comprises partially dehydrating aluminum hydroxide at a temperature of approximately 1300° C., dry grinding the dehydrated aluminum hydroxide to an average particle size less than 50 microns, blending the ground particles with similarly sized particles of magnesia and silica to an amount not exceeding 8% of magnesia and 12% of silica, forming and firing at a temperature below 1700° C.

12. A process of making an aluminous product which is uniformly hard, dense, vitreous, and non-porous which comprises partially dehydrating aluminum hydroxide at a temperature below 1350° C., dry grinding the dehydrated hydroxide to an average particle size less than 20 microns, blending the ground particles with similarly sized particles of magnesia and silica to an amount less than 10% by weight, forming and firing at a temperature not exceeding 1500° C.

13. A process of making an aluminous product which is uniformly hard, dense, vitreous and non-porous which comprising partially dehydrating aluminum hydroxide at a temperature insufficient to completely dehydrate the hydroxide, dry grinding the dehydrated hydroxide to an average particle size below 50 microns, separately dry grinding magnesia to an average particle size below 50 microns, separately dry grinding silica to an average particle size below 50 microns, blending in complete intermixture the ground particles of aluminum hydroxide, magnesia and silica, forming and firing the mixture at a temperature below 1600° C.

14. A process of making an aluminous product which is uniformly hard, dense, vitreous and non-porous which comprises partially dehydrating aluminum hydroxide at a temperature insufficient to completely dehydrate the hydroxide, dry grinding the dehydrated hydroxide to an average particle size below 20 microns, separately dry grinding magnesia to an average particle size below 20 microns, separately dry grinding silica to an average particle size below 20 microns, blending in complete intermixture the ground particles of aluminum hydroxide, magnesia and silica, forming and firing the mixture at a temperature below the fusion temperature of alumina.

15. A process of making an aluminous product which is uniformly hard, dense, vitreous, and non-porous which comprises partially dehydrating aluminum hydroxide at a temperature below 1400° C., dry grinding the dehydrated hydroxide to an average particle size below 50 microns, separately dry grinding magnesia and silica to an average particle size less than 20 microns, blending the ground aluminum hydroxide and ground magnesia and silica in the proportion of 5 to 20 parts of silica and magnesia to 95 to 80 parts of aluminum hydroxide, forming the blended material and firing to a temperature below the fusion temperature of the alumina.

16. A process of making an aluminous product which is uniformly hard, dense, vitreous, and non-porous which comprises partially dehydrating aluminum hydroxide, dry grinding the aluminum hydroxide with magnesia and silica to an average particle size less than 20 microns, blending the materials, forming and firing.

JOHN ALLEN HEANY.